United States Patent
Huang et al.

(10) Patent No.: US 10,474,877 B2
(45) Date of Patent: Nov. 12, 2019

(54) AUTOMATED EFFECTS GENERATION FOR ANIMATED CONTENT

(71) Applicant: Google LLC, Mountain View, CA (US)

(72) Inventors: Peter Chi-Hao Huang, Redwood City, CA (US); Erick Hachenburg, Menlo Park, CA (US); Bryan Hart, Palm Beach Gardens, FL (US); Valentin Zulkower, Edinburgh (GB)

(73) Assignee: Google LLC, Mountain View, CA (US)

( * ) Notice: Subject to any disclaimer, the term of this patent is extended or adjusted under 35 U.S.C. 154(b) by 375 days.

(21) Appl. No.: 15/402,189

(22) Filed: Jan. 9, 2017

(65) Prior Publication Data

US 2017/0193280 A1    Jul. 6, 2017

Related U.S. Application Data

(63) Continuation-in-part of application No. 15/043,612, filed on Feb. 14, 2016, which is a continuation-in-part
(Continued)

(51) Int. Cl.
*G06F 16/00* (2019.01)
*G06K 9/00* (2006.01)
(Continued)

(52) U.S. Cl.
CPC ..... *G06K 9/00234* (2013.01); *G06F 3/04842* (2013.01); *G06F 16/434* (2019.01);
(Continued)

(58) Field of Classification Search
CPC ............ G06K 9/00234; G06K 9/00281; G06T 11/60; G06T 13/40; G06T 2207/10016;
(Continued)

(56) References Cited

U.S. PATENT DOCUMENTS 8,073,203 B2 * 12/2011 Tang ...................... H04N 7/147
345/633
8,189,685 B1 * 5/2012 Choudhry ............... G06F 16/70
375/240.26
(Continued)

FOREIGN PATENT DOCUMENTS

CN         102054033 A       5/2015
NL    WO 2009/047674 A2    4/2009

OTHER PUBLICATIONS

U.S. Appl. No. 14/862,095, filed Sep. 22, 2015.
(Continued)

*Primary Examiner* — Cheryl Lewis
(74) *Attorney, Agent, or Firm* — Dority & Manning, P.A.

(57) ABSTRACT

Various embodiments relate generally to a system, a device and a method for automating effects generation for media content. A media content item is received in a media content management system. Data representing one or more static regions associated with the media content item are determined. A canvas mapping object comprising the data representing the one or more static regions of the media content item is generated based on the frames of the media content item. The media content item is stored in a database in the media content management system in association with the canvas mapping object, and the media content item and the canvas mapping object are provided in response to a search request associated with the media content item.

20 Claims, 11 Drawing Sheets

Related U.S. Application Data of application No. 14/862,095, filed on Sep. 22, 2015, application No. 15/402,189, which is a continuation-in-part of application No. 14/862,111, filed on Sep. 22, 2015, and a continuation-in-part of application No. 14/862,114, filed on Sep. 22, 2015, and a continuation-in-part of application No. 15/192,835, filed on Jun. 24, 2016, now Pat. No. 10,303,925.

(51) Int. Cl.

| | | |
|---|---|---|
| G06T 7/285 | (2017.01) | |
| G06T 11/60 | (2006.01) | |
| G06T 13/80 | (2011.01) | |
| G06T 13/40 | (2011.01) | |
| G06F 3/0484 | (2013.01) | |
| G06F 16/44 | (2019.01) | |
| G06F 16/432 | (2019.01) | |
| G06F 16/783 | (2019.01) | |
| G06F 16/583 | (2019.01) | |
| G06F 16/435 | (2019.01) | |
| G06F 16/532 | (2019.01) | |

(52) U.S. Cl.
CPC ............ *G06F 16/435* (2019.01); *G06F 16/44* (2019.01); *G06F 16/532* (2019.01); *G06F 16/5854* (2019.01); *G06F 16/784* (2019.01); *G06K 9/00281* (2013.01); *G06T 7/285* (2017.01); *G06T 11/60* (2013.01); *G06T 13/40* (2013.01); *G06T 13/80* (2013.01); *G06T 2207/10016* (2013.01); *G06T 2207/10024* (2013.01); *G06T 2207/20221* (2013.01); *G06T 2207/30201* (2013.01); *G06T 2210/12* (2013.01)

(58) Field of Classification Search
CPC ....... G06T 2207/30201; G06F 3/04842; G06F 16/40; G06F 16/436; G06F 16/434; G06F 16/784
See application file for complete search history.

(56) References Cited

U.S. PATENT DOCUMENTS

| | | | |
|---|---|---|---|
| 9,519,723 B2 | 12/2016 | Lorenz et al. | |
| 9,596,206 B2 | 3/2017 | Bueno et al. | |
| 9,721,394 B2* | 8/2017 | Rosenthal | H04N 21/41407 |
| 9,858,598 B1* | 1/2018 | Sivertsen | G06Q 30/0264 |
| 9,870,798 B2* | 1/2018 | Pribula | H04N 21/43615 |
| 2005/0060643 A1 | 3/2005 | Glass et al. | |
| 2005/0257240 A1* | 11/2005 | Faulkner | G06F 16/58 |
| | | | 725/92 |
| 2007/0188502 A1* | 8/2007 | Bishop | G06T 13/40 |
| | | | 345/473 |
| 2007/0260984 A1* | 11/2007 | Marks | A63F 13/06 |
| | | | 715/706 |
| 2007/0268312 A1* | 11/2007 | Marks | A63F 13/06 |
| | | | 345/633 |
| 2008/0013916 A1* | 1/2008 | Sharpe | G11B 27/034 |
| | | | 386/278 |
| 2010/0123724 A1 | 5/2010 | Moore et al. | |
| 2010/0202750 A1* | 8/2010 | Senftner | G06T 15/00 |
| | | | 386/278 |
| 2011/0144801 A1 | 6/2011 | Selker et al. | |
| 2011/0304629 A1* | 12/2011 | Winchester | G06T 13/40 |
| | | | 345/473 |
| 2012/0254804 A1 | 10/2012 | Sheha et al. | |
| 2013/0050747 A1 | 2/2013 | Cok et al. | |
| 2014/0184841 A1 | 7/2014 | Woo et al. | |
| 2014/0219634 A1 | 8/2014 | McIntosh et al. | |
| 2014/0244621 A1 | 8/2014 | Lindsay | |
| 2014/0280113 A1 | 9/2014 | Hohwald | |
| 2014/0282099 A1* | 9/2014 | Bronder | H04L 67/2838 |
| | | | 715/753 |
| 2015/0100537 A1 | 4/2015 | Grieves et al. | |
| 2015/0127453 A1 | 5/2015 | Tew et al. | |
| 2015/0277686 A1 | 10/2015 | LaForge et al. | |
| 2016/0057576 A1 | 2/2016 | Kessler et al. | |
| 2016/0073166 A1 | 3/2016 | Hu et al. | |
| 2016/0098851 A1* | 4/2016 | Wu | G06T 11/60 |
| | | | 345/634 |
| 2016/0315995 A1* | 10/2016 | Hausler | G06F 16/248 |
| 2016/0323507 A1* | 11/2016 | Chong | G06T 13/80 |
| 2017/0031548 A1* | 2/2017 | Dellinger | G06F 3/0482 |
| 2017/0046065 A1 | 2/2017 | Zeng et al. | |
| 2017/0064034 A1* | 3/2017 | Vasthimal | H04L 67/306 |
| 2017/0083519 A1 | 3/2017 | McIntosh et al. | |
| 2017/0083520 A1 | 3/2017 | McIntosh et al. | |
| 2017/0083524 A1 | 3/2017 | McIntosh et al. | |
| 2017/0083586 A1 | 3/2017 | McIntosh et al. | |
| 2017/0212892 A1 | 7/2017 | McIntosh et al. | |
| 2018/0068475 A1 | 3/2018 | Blue et al. | |
| 2018/0129748 A1* | 5/2018 | Bosarge | G06F 16/951 |
| 2018/0262452 A1* | 9/2018 | Guthery | G06Q 20/26 |
| 2018/0303397 A1* | 10/2018 | Krupat | G06Q 30/0271 |

OTHER PUBLICATIONS

U.S. Appl. No. 15/043,612, filed Feb. 14, 2016.
U.S. Appl. No. 14/862,111, filed Feb. 22, 2015.
U.S. Appl. No. 14/862,114, filed Sep. 22, 2015.
U.S. Appl. No. 15/402,208, filed Jan. 9, 2017.
U.S. Appl. No. 15/192,835, filed Jun. 24, 2016.
U.S. Appl. No. 15/260,296, filed Sep. 8, 2016.
U.S. Appl. No. 15/909,924, filed Mar. 1, 2018.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Jou et al., "Predicting Viewer Perceived Emotions in Animated GIFs", Nov. 3-7, 2014 (4 pages).
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Forouharnejad, Faezeh, Office Action for U.S. Appl. No. 14/862,095 dated Jan. 9, 2018.
Forouharnejad, Faezeh, Office Action for U.S. Appl. No. 14/862,111 dated Jan. 9, 2018.
Forouharnejad, Faezeh, Office Action for U.S. Appl. No. 14/862,114 dated Dec. 29, 2017.
Le, Sarah, Office Action for U.S. Appl. No. 15/260,296 dated Feb. 22, 2018.
Flynn, "Facebook Messenger Update Adds GIF Searching to Keyboard, Without Third-Party Download", https://web.archive.org/web/20151026155951/http://www.ibtimes.com/facebook-messenger-update-adds-gif-searching-keyboard-without-third-party-download-2011775, retrieved on Jun. 21, 2018, 5 pages.
PopKey, "The World's First Animated GIF Keyboard", https://web.archive.org/web/20150925034643/http://popkey.co/ios?ref=footer_section, retrieved on Jun. 21, 2018, 7 pages.
Anonymous, "Popkey + GIF Keyboard", https://www.youtube.com/watch?v=1g47CgiAYvl, published on Sep. 16, 2015.
Mohr, Carolyn Nicander, "PopKey: The Most Fun You Can Have with a Keyboard", Aug. 29, 2015, https://web.archive.org/web/20150829083452/https://www.wonderoftech.com/popkey/, retrieved Dec. 14, 2018, 23 pages.

* cited by examiner

AUTOMATED EFFECTS GENERATION FOR ANIMATED CONTENT

CROSS-REFERENCE TO RELATED APPLICATIONS

This application is a continuation-in-part application of a U.S. Non-Provisional patent application Ser. No. 15/043,612, filed Feb. 14, 2016, which is a continuation-in-part of U.S. Non-Provisional patent application Ser. No. 14/862,095 filed Sep. 22, 2015; this application also is a continuation-in-part application of a U.S. Non-Provisional patent application Ser. No. 14/862,111, filed Sep. 22, 2015; this application is a continuation-in-part application of U.S. Non-Provisional patent application Ser. No. 14/862,114, filed Sep. 22, 2015; and this application is a continuation-in-part application of U.S. Non-Provisional patent application Ser. No. 15/192,835, filed Jun. 24, 2016, all of the above-referenced properties are herein incorporated by reference in their entirety for all purposes.

FIELD

Various embodiments relate generally to electrical and electronic hardware, computer software, wired and wireless network communications, and distributed software applications for enabling users to communicate with each other through graphical, or pictorial, content. More specifically, examples of a system and a method are configured to process media content items to preprocess content, including animated content for implementation in association with animated inputs in a dynamic interface, whereby the preprocessing of media content items may generate effects in association with the media content items to facilitate communication via symbolic imagery.

BACKGROUND

Conventional techniques for communicating among people have evolved away from mere pen-and-paper implementations of alphanumeric characters (i.e., text) as complex and creative messaging have increasingly relied on technological solutions. With the advent of computing devices, people communicate via the Internet in a multitude of ways through a myriad of platforms using a multitude of devices.

For example, some conventional approaches for communicating between users of mobile devices may simply rely on SMS, messaging through a social networking application, or "texting," using alphabetic and numeric characters. Users of the Internet or mobile devices may exchange electronic messages through these various mediums, for example. However, occasionally, users may wish to communicate via media content, such as GIFs (Graphics Interchange Format), or image files that include a static or animated set of images to communicate symbolism of concepts. Users may search the Internet for GIFs, manually download them through an operating system's native web browser, and upload the downloaded GIFs in a message through various messaging applications. These conventional systems are not well-suited to present multiple images within a dynamic interface, including animated imagery or motion.

While conventional approaches are functional, the usual structures and/or functionalities for presenting media content are not suited to the increasing technological demands required to optimally share user-generated expressive content to facilitate communication via symbolic imagery or audio rather than the limitations of using alphabetic and numeric characters.

Thus, what is needed is a solution for effectively displaying media content without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1A:
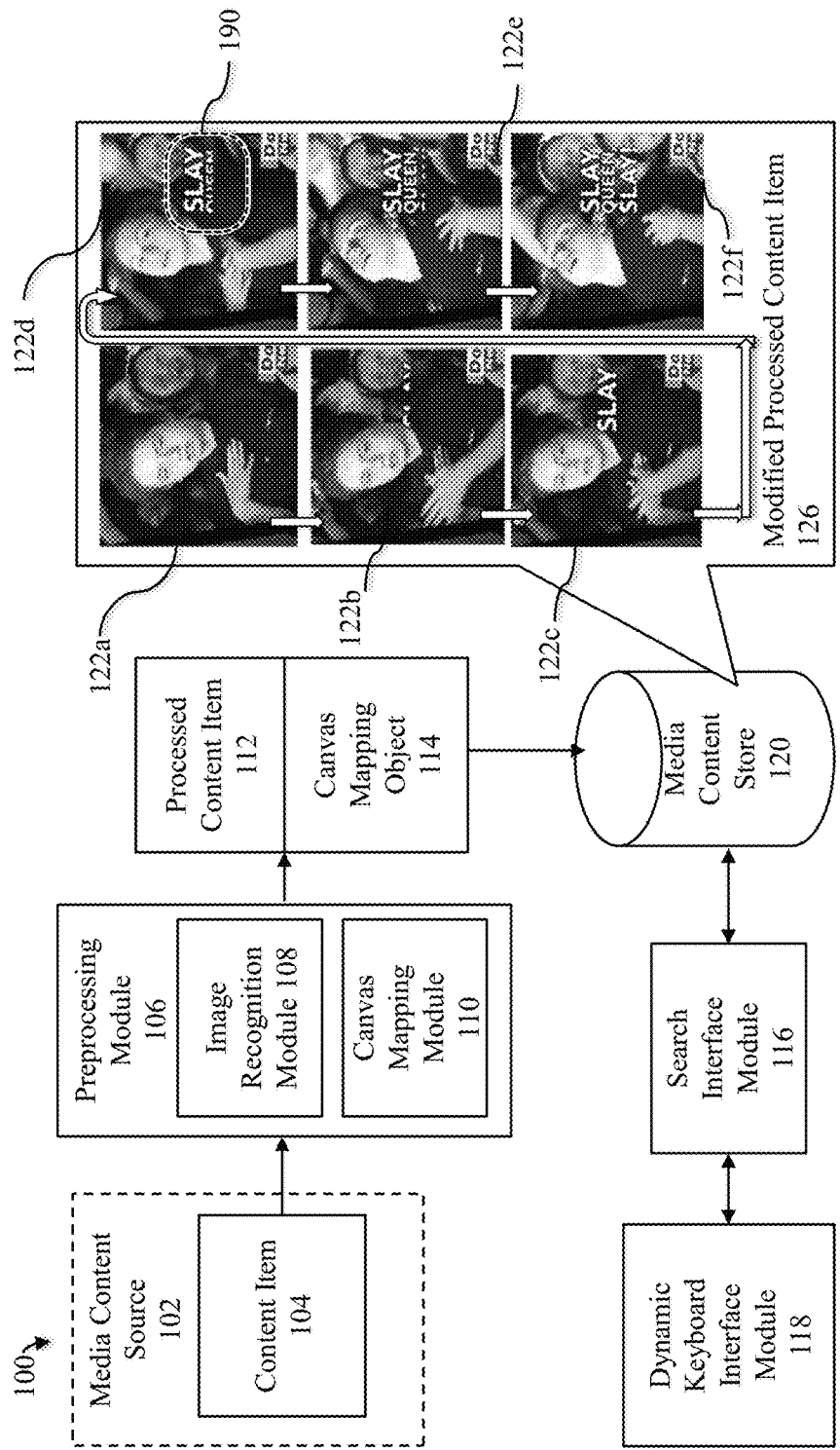
FIG. 1A is a block diagram depicting a system configured to preprocess media content items for automated effects generation in a media content management system, according to an embodiment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Communicating with other people in the Internet age has never been easier. People may communicate through various messaging platforms, including, but not limited to, SMS, iMessage, social networking systems such as FACEBOOK and TWITTER, as well as other messaging applications like SNAPCHAT, WECHAT, LINE, and so forth. While text messaging remains the predominate method of communication, more and more pictorial messaging has emerged. Messaging applications may be configured to transmit and receive text messages that include pictorial content, with the text conveys information from one person to another, in at least some implementations. The information conveyed may use pictorial content as a communication medium that need not rely on text as symbols alone, but rather imagery presented concurrently or sequentially (e.g., over a timeline) that includes animated text, images, image movement, and other substantive pictorial content that conveys a larger idea, concept, expressive statement, emotion, and even one or more semi-structured sentences. Pictorial content is usually originally formatted as a video file. Further, compression techniques may be implemented in one or more examples to transform one or more images into an animated GIF (Graphical Interchange Format) content item. In some cases, various examples may be implemented to reduce the file size of the content item to enable relatively fast loading of the GIFs in a mobile interface. Additionally, various examples of implementations described herein may provide techniques for searching and detecting an appropriate image (e.g., GIF) that optimally conveys a "concept" a user wishes to convey with relatively reduced or negated impacts on user experience than otherwise might be the case. In one example, a communicating-user may detect (e.g., browse collections of content items) and import (e.g., by copying and pasting) a particular content item that optimally communicates a user's expressive intent (e.g., using one or more subsets animated imagery, such as one or more animated GIFs, with minimal or no numeric or alphabetic characters).

FIG. 1A is a block diagram depicting a system configured to preprocess media content items for automated generations of effects, according to some embodiments. Media content management system 100 may receive a content item 104 from a media content source 102. In the example shown, a preprocessing module 106 may include an image recognition module 108 and a canvas mapping module 110. An image recognition module 108 may be configured to detect one or more facial features (e.g., pixelated facial portions) and may implement facial recognition algorithms, color difference value algorithms, and/or other algorithms to detect moving and non-moving ("static") images across multiple frames (e.g., over multiple frames 122*a*-122*f*) in the received content item 104. A canvas mapping module 110 may be configured to identify data representing one or more regions of one or more images with which visual modifications may be implemented, such as adding graphical imagery, such as sunglasses over regions associated with "eyes," as facial features. Canvas mapping module 110 may be configured to use data representing the images, such as faces, eyes, and/or static spaces (e.g., one or more two dimensional areas of the content item in which little to no movement is detected), whereby such spaces or regions may be used to define a canvas region based on that data. In some examples, the canvas region may be configured to include special effects, such as captioning, animated text, animated images (e.g., superimposed sunglasses), and the like.

Preprocessing module 106 may generate a processed content item 112 and a canvas mapping object 114. The canvas mapping object 114 may include the data defining the canvas region, such as location coordinates as indicated by pixel location, or a subset of pixel locations specifying a perimeter of canvas mapping object 114 or a surface representing one or more portions of canvas mapping object 114. In one embodiment, a canvas region may be selected from one or more static spaces identified by preprocessing module 106. In a further embodiment, a canvas region may include data representing regions (e.g., bounded regions of an image) that may be characterized by, or implemented with, a minimum threshold of area, such as a threshold representing a minimum number of pixels (e.g., a pixel region threshold). A minimum threshold of area may be configured to include an amount of text characters at a specified font size on, or associated with, the content item. In yet another embodiment, a canvas region may be dynamically selected upon receiving a request to generate special effects on a processed content item 112. In this case, several areas of the content item, or bounded regions identified by location coordinates, may be identified as potential canvas regions. The data representing the one or more canvas regions may be stored in a canvas mapping object 114. A canvas mapping object 114 may be a data arrangement, data object, or otherwise instantiated data representation as known in the state of the art. In one embodiment, the canvas mapping object 114 may be stored as a metadata attribute of the processed content item 112. Metadata attributes may be data items that may be stored within data objects, or in other data representations as known in the state of the art. In a further embodiment, the canvas mapping object 114 may be stored in association with the processed content item 112 in a media content store 120.

A search interface module 116 may receive search requests from a dynamic keyboard interface module 118, such as keywords and/or emoji associated with media content items stored in the media content store 120. The dynamic keyboard interface module 118 may be configured to retrieve two or more media content items from the media content store 120 through the search interface module 116 to display the two or more media content items in animation concurrently. In one embodiment, the dynamic keyboard interface module 118 enable users to add special effects, such as electronic stickers, animated text, sounds, graphics, and other user-generated content. Through a user device, users may create meme-like captioning on a processed content item 112 retrieved through the search interface module 116. After modifying the processed content item 112, the modified processed content item 126 may be stored in the media content store 120, in one embodiment. Or, modified processed content item 126 may be transmitted via a text messaging application. Examples of multiple frames 122 of an example modified processed content item 126 is illustrated in FIG. 1A. Multiple frames 122 may be perceived, for example, as an animated GIF-based image.

FIG. 1A and the other figures use like reference numerals to identify like elements. A letter after a reference numeral, such as "122*a*," indicates that the text refers specifically to the element having that particular reference numeral. A reference numeral in the text without a following letter, such as "122," refers to any or all of the elements in the figures bearing that reference numeral (e.g., "122" in the text may refer to reference numerals "122*a*" and/or "122*b*" in the figures). Only six frames 122 are illustrated in FIG. 1A in order to simplify and clarify the description, though additional frames 122 may be used to form a modified processed content item 126. As illustrated, frame 122*a* represents a start frame of a media content item, such as a GIF, and frame 122*f* represents the final frame of the media content item. Bounded region 190 of the modified processed content item 126 may be modified to include animated text as the caption, "SLAY QUEEN, SLAY!" and is stacked vertically in three lines, each of which may be sequentially displayed. As shown in frames 122*b*, 122*c*, 122*d*, 122*e*, and 122*f*, the animated caption remains within the bounded region, or the canvas region. The font size of the text "QUEEN," is smaller than the font size of the words "SLAY" and "SLAY!" while "SLAY!" is smaller in font size than the word "SLAY", indicating that font size may be altered based on the length of the word and the size of the bounded region. In one embodiment, user-generated captions may be animated and then divided amongst the frames 122 of the modified processed content item 126.

Figure 1B:
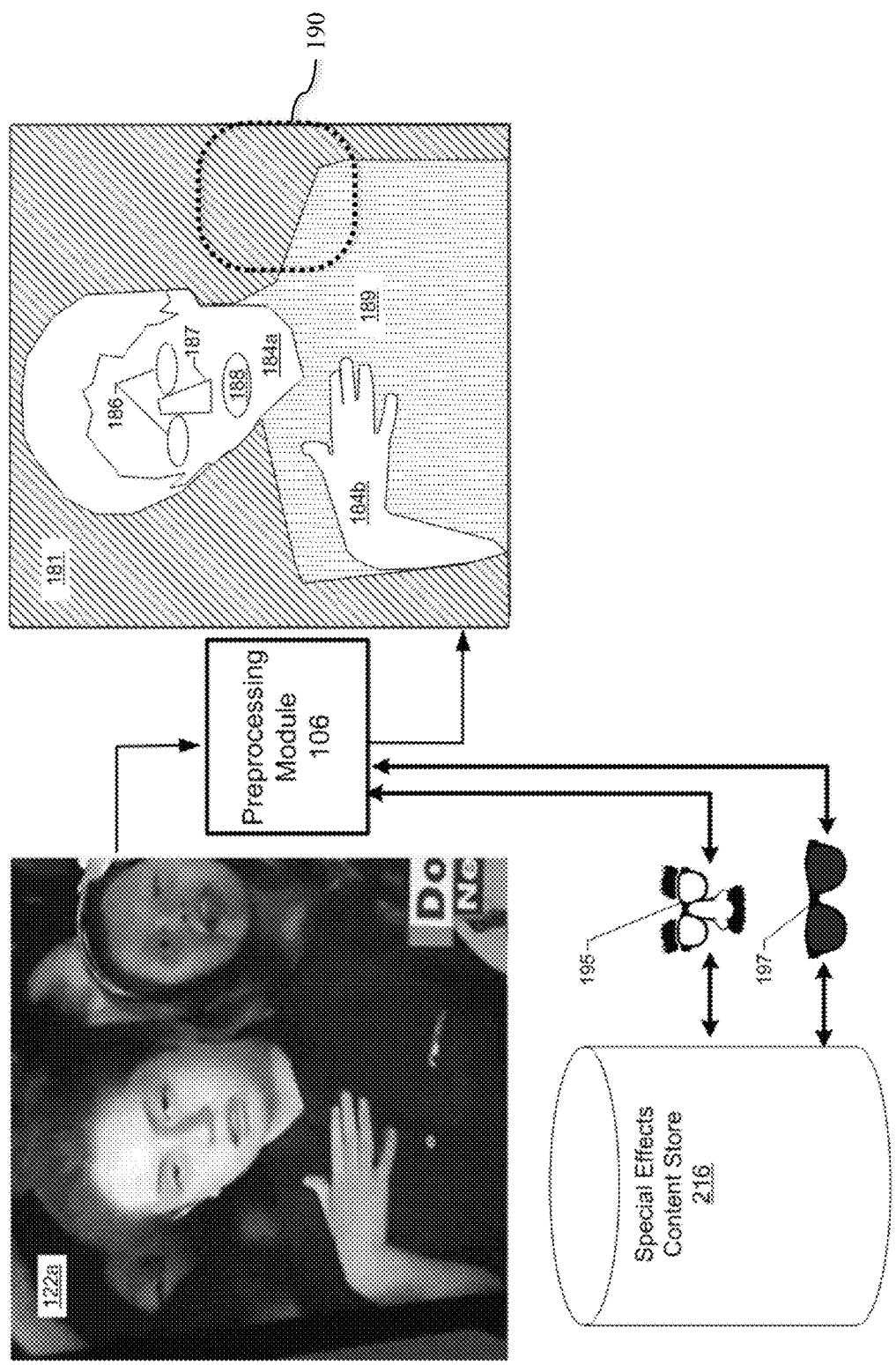
FIG. 1B depicts an example of the operation of a preprocessing module, according to an embodiment.

FIG. 1B depicts an example of the operation of a preprocessing module, according to an embodiment. As shown, preprocessing module 106 may be configured to perform image processing on a content item (e.g., a frame 122*a* or multiple frames) including an image. Preprocessing module 106 of FIG. 1B may further be configured to identify a canvas region, or multiple canvas regions. In the example shown, preprocessing module 106 can detect pixel data representing a face 184*a* and a limb 184*b* (e.g., a hand and a portion of an arm). Further, preprocessing module 106 can detect pixel data representing regions 186 associated with "eyes," pixel data representing a region 187 representing a "nose," pixel data representing a region 188 representing a mouth 188, and pixel data representing a region 189 representing a torso (e.g., a clothed torso). In some examples, preprocessing module 106 of FIG. 1B can determine regions 184*a*, 184*b*, 186, 187, and 188 constitute a person, such a person and associated pixel data may be characterized as a foreground. Thus, background 181 can represent a canvas region on which animated imagery (or a portion thereof) may be superimposed. As shown in FIG. 1A, animated text may be added in boundary 190.

According to some examples, preprocessing module 106 of FIG. 1B can perform sentiment analysis by identifying metadata (e.g., text describing attributes or collections, such as "happy," "cool," "funny," "angry," etc.) and contextual information (e.g., location of sender, time of day, recipient of modified content item, etc.) to determine one or more expressive states of an image automatically (e.g., without user or manual intervention). In some cases, preprocessing module 106 of FIG. 1B can analyze facial features to predicate an expressive state of the image. Further, preprocessing module 106 of FIG. 1B can automatically present a subset of special effects (e.g., stored in special effects content store 216 of FIG. 2) as a function of the expressive state, such as "cool" expressive state (e.g., a content item selected by user may be associated with a concept of "cool" or expressing zealous "approval" or "admiration."). In this case, preprocessing module 106 of FIG. 1B may select special effect data 197 representing glasses associated with "cool" rather than special effect data 195, which is associated with "funny" or "laughter."

As mentioned above, content items 104 may include data representing various types of content, such as animated GIFs (a series of images), a static image, an audio-visual content item/video, as well as composite content items, such as multiple animated GIFs and/or image content. Further, content items may include data representing audio or any other media that may be perceived by any of the human senses, such as tactile (e.g., touch) senses, olfactory senses, etc., according to some examples.

In one embodiment, a user of the media content management system 100 may, through a user device, add content to a media content management system 100. For example, a user may have installed an application extension onto the user device such that the user can "save" a content item found through browsing a web page using a browser on the user device. The application extension may, in one embodiment, include a downloadable application that enables a user to browse to a web page and collect media content items presented on a web page or any other source of media. As an example, a web page for a blog may post a particularly interesting content item that may or may not be available on the media content management system 100. Using the application extension, the user may browse to the web page, access a menu through the browser, and select an option to save one or more content items that have been presented on the web page. In one embodiment, the application extension is a mobile application that enables mobile browsers to perform this functionality. In other embodiments, the application extension may be a browser extension application or applet that may be downloaded through the browser on a mobile device or desktop computer. In a further embodiment, the application extension may enable users to directly upload content items to the media content management system 100. Use of the application extension, among other functions described here, are further elaborated in the aforementioned applications incorporated by reference above.

Content items, presented on web pages or otherwise accessible through web servers, may be procured by administrators of the media content management system 100 in other ways, in an embodiment. For example, content generators, developers, and or owners, such as movie studios, television studios, brand owners, and other content generators, may partner with administrators of the media content management system 100 such that licensed content may be delivered to the media content management system 100. In such a procurement process, content owners may provide content items 104 as mentioned above. A media content source 102, such as a content owner, may include content stores or databases on servers maintained and operated by the third-party sources or websites, for example.

Figure 1C:
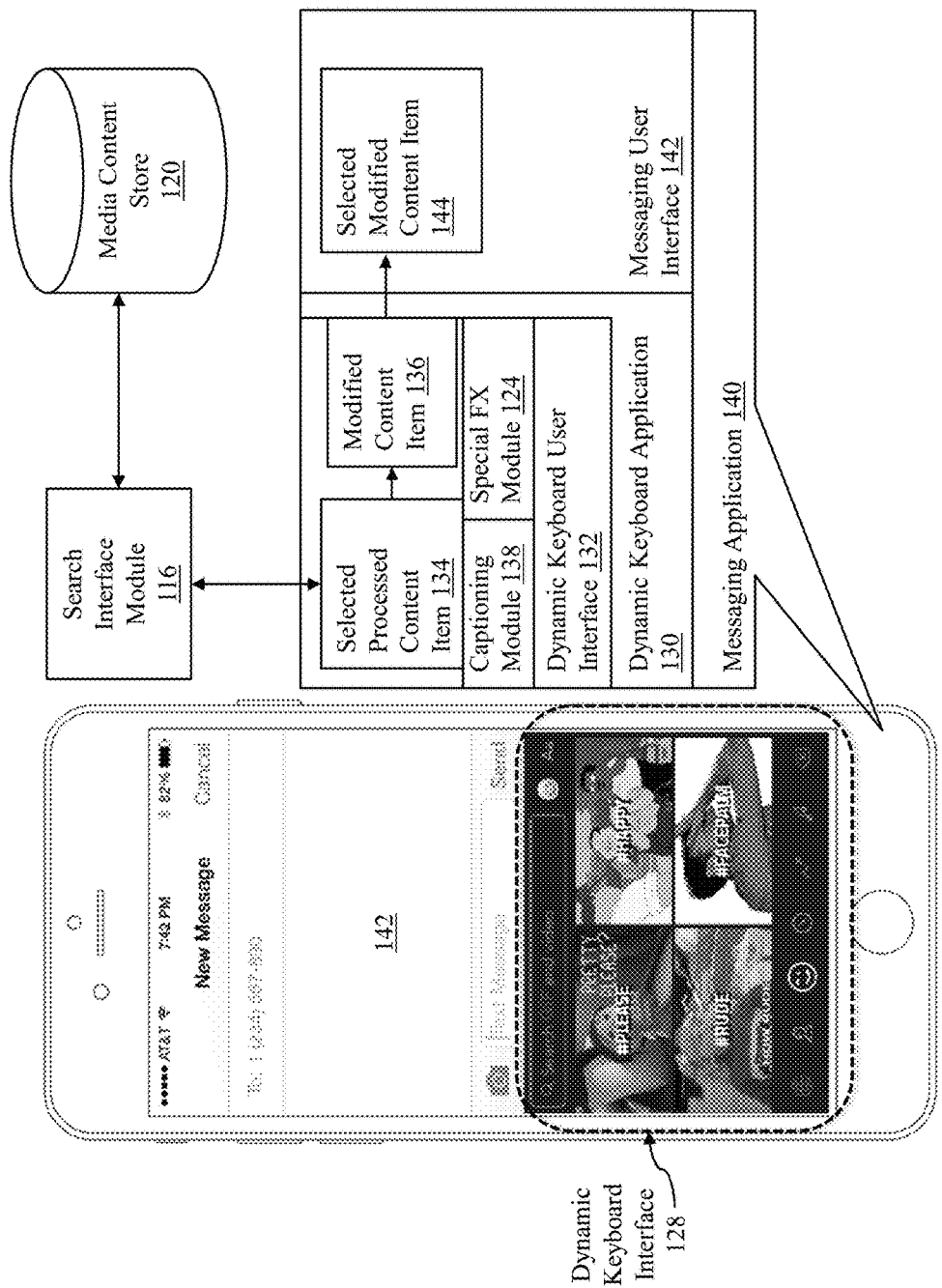
FIG. 1C is a block diagram depicting a process of modifying a selected media content item from animated inputs in a dynamic interface to automatically add effects to the selected media content item, according to an embodiment.

As illustrated in FIG. 1C, a dynamic keyboard user interface 132 may be rendered on a device (e.g., a user device, such as a mobile computing device or phone) through a dynamic keyboard application 130 installed on the user device. The dynamic keyboard application 130 may install a dynamic keyboard user interface 132 that enables a dynamic keyboard interface 128 to be accessed throughout the user device as a third-party keyboard. In this way, a messaging user using a messaging application 140, such as the APPLE IMESSAGE, SMS, texting, or other messaging platform such as FACEBOOK MESSENGER, TWITTER, EMAIL, and the like, may access the dynamic keyboard interface 128 from within the messaging application 140.

FIG. 1C is a block diagram depicting a process of modifying a selected media content item from animated inputs in a dynamic interface to automatically add effects to (or otherwise modify) the selected media content item, according to at least one an embodiment. As further illustrated in FIG. 1C, processed content items 112 are rendered in the dynamic keyboard interface 128 through the dynamic keyboard user interface 132 communicating with the search interface module 116. In one embodiment, a set of collections may be selected for display on the dynamic keyboard interface 128. The term "collection" may refer to a grouping of content items (e.g., grouped based on attributes or characteristics describing expressive intent), according to some examples. A collection may be generated by administrators of the media content management system 100, in one embodiment. A collection may be automatically generated, in one embodiment, based on one or more attributes shared by the content items 104 in the collection. In an embodiment, a content association, or a unique identifier, may be used to denote a collection in the media content management system 100. For example, a media content item 104 may be "content associated" as part of the "#happy" collection in the media content management system 100. In one embodiment, a user or an administrator may classify or otherwise associated media content item 104 as part of the a grouping having similar attributes associated with an expressive state, such as a "#happy" collection. In another embodiment, a first content item 104 may be automatically associated (e.g., via a content association) with one or more other content items 104 using content associations stored in the media content management system 100. In this way, content may be procured and categorized using content associations, such as "#happy," in the media content management system 100. Individual collections, or set of files, may each be labeled or identified with a content association in the media content management system 100. A particular file may be associated with one or more content associations, according to at least one embodiment.

As illustrated in FIG. 1C, the dynamic keyboard interface 128 may be configured to present groups of related content, such as "#PLEASE," "#HAPPY," "#RUDE," and a "#FACEPALM" collections. Although the hashtag symbol ('#') is used in the examples included here, content associations need not necessarily include a hashtag. By selecting an animated key on the dynamic keyboard interface 128, the collection of processed content items 112 may be retrieved from the media content store 120 by the search interface module 116 and then rendered by the dynamic keyboard user interface 132 in the dynamic keyboard interface 128. In this way, the searching user is searching the media content management system 100 by using the selected content association, such as "#HAPPY." The retrieved collection of processed media content items 112 may be rendered within the dynamic keyboard interface 128. Because the "#HAPPY" collection may be updated and added to in real-time, a user who is searching for certain content may be presented with different media content items as items (e.g., new items) are added to the collection. As mentioned above, processed content items 112 may be processed (e.g., preprocessed) to identify one or more canvas regions, as stored in one or more canvas mapping objects 114, thus enabling the processed media content items 112 to be relatively quickly annotated with one or more special effects (e.g., via dynamic keyboard interface 128). Collections, content associations, and preprocessing, among other features described here, are further elaborated in the aforementioned applications incorporated by reference above. According to some examples, the term "processed content item" may refer, at least in some cases, to a media content item for which regions (e.g., canvas regions) are identified, such as described in FIG. 1B and other drawings. In some implementations, a processed content item includes identified characteristics or attributes of the content item (e.g., identify metadata and context) with which files (e.g., GIF files) may be grouped into collections or which an expressive intent may be associated.

A user may select a processed content item 134, while searching for content with certain expressive intent, from the dynamic keyboard interface 128 by touching or otherwise interacting with the dynamic keyboard user interface 132. The selected processed content item 134 may then be modified using a captioning module 138 and/or a special effects ("FX") module 124 accessible through the dynamic keyboard user interface 132 on the dynamic keyboard application 130. Optionally, modified content item 136 may be transmitted or pasted into the messaging user interface 142 of the messaging application 140 as a selected modified content item 144. In one embodiment, the selected modified content item 144 may be selected by clicking, tapping, or touching the dynamic keyboard interface 128 and holding the selected modified content item 144 to "copy" the content so that it can be "pasted" into the messaging application 140 through the messaging user interface 142. This copy and paste method may take advantage of the operating system of the user device, in one embodiment, such that the selected modified content item 144 need not be stored permanently onto the user device. In one embodiment, messaging application 140 may be configured to automatically select modified content item 144 (e.g., based on priority or probability), and to automatically import the selected modified content item 144 in user interface 142. The user may select another content item or may desire to transmit selected modified content item 144 to a recipient. In another embodiment, the modified content item 136 is automatically stored in the dynamic keyboard application 130 and may be stored separately in the media content store 120 through the search interface module 116. In another embodiment, a searching user may search for media content through a search field on the dynamic keyboard interface 128, described in the related applications mentioned above and incorporated by reference. In this way, content items 104 may be processed on the media content management system 100 and then retrieved, modified, and shared as selected modified content items 144 through any messaging platform available on the user's device. Further, the methods and systems described herein provide multiple different animated images representing a communication concept, such as an emotion, a reaction, an emoji depicting the communication concept, and so forth, such that the animated images may be loaded into a client device's memory to effect rapid loading of animated images as "keys" of the dynamic keyboard interface as a group of keys shown, in animation, simultaneously. In at least some embodiments, a dynamic keyboard interface 128 can be implemented as a GIF keyboard, as produced by TENOR, INC. of San Francisco, Calif. (formerly RIFFSY, INC.).

Figure 1D:
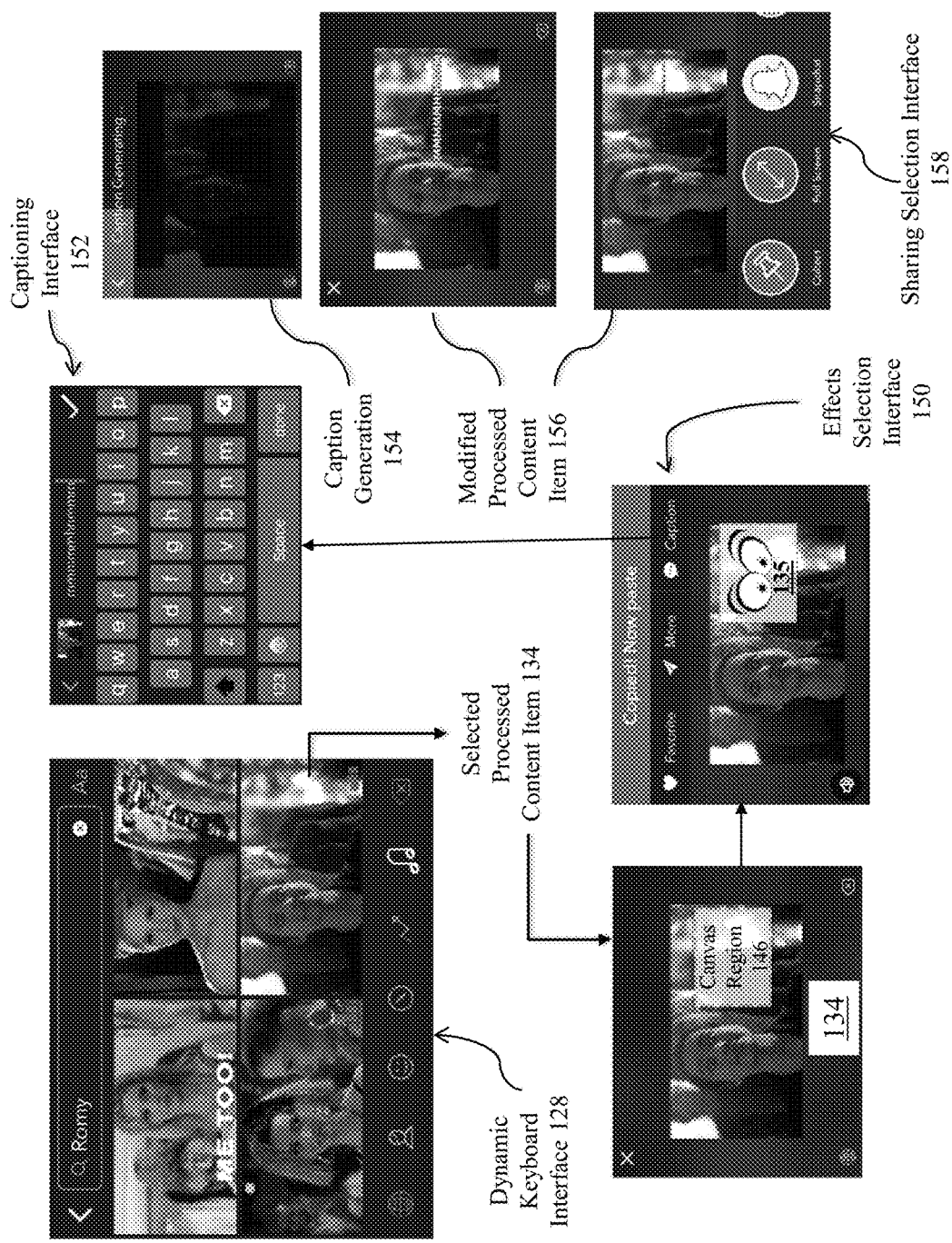
FIG. 1D is a block diagram depicting example screenshots of automatically adding generated effects from a selected media content item from animated inputs in a dynamic interface, according to an embodiment.

FIG. 1D is a block diagram depicting example screenshots of automatically adding generated effects from a selected media content item from animated inputs in a dynamic interface, according to an embodiment. A dynamic keyboard interface 128 illustrates an example screenshot in which the keyword "ROMY" has been entered by a user in a search field, and several processed content items 112 have been retrieved that are relevant to that keyword. A user may select one of the processed content items 112 by tapping, touching, holding, or otherwise interacting with the processed content item, and the selected processed content item 134 may include a canvas mapping object (not illustrated) that has identified a canvas region 146 within the selected processed content item 134. The canvas region 146 may be a bounded region having multiple location coordinates by pixels within the selected processed content item 134.

An effects selection interface 150 may be accessible through the user interface provided by the dynamic keyboard interface 128. The effects selection interface 150 may become accessible after holding down, touching, or otherwise selecting the selected processed content item 134. For example, a graphical image 135 of "eyes popping" may relate to or reinforce an expressive state of "surprise" or "incredulity" (e.g., OMG, or Oh My Gosh) conveyed by selected processed content item 134. The data representing "eye-popping" imagery 135 may be superimposed on selected processed content item 134.

As another example, a "Caption" option may enable the user to generate a caption for the selected processed content item 134. Once the "Caption" option is selected, a captioning interface 152 may be provided to the user through the dynamic keyboard interface 128. In this example screenshot illustrated in FIG. 1D, the user added the caption, "mmm-mmhnmm" in the captioning interface 152 text entry field. For example, caption "mmmmmhnmm" or "mmhmm" may be an expression of agreement or sarcastic acknowledgment (e.g., "OK, oh yea----riiigggghhhttttt". A caption generation dialog screen 154 may then be presented to alert the user that the captioning, or the special effect, is being automatically generated based on the canvas region 146 identified in the canvas mapping object associated with the selected processed content item 134. The added caption creates an additional effect that adds to the non-verbal communicative statement of the images in the content item, thus enhancing the symbolism of content item.

The modified processed content item 156 is then presented to the user through the dynamic keyboard interface 128. Upon selecting, through holding down, touching, or otherwise interacting with the modified processed content item 156, sharing options may be presented through a sharing selection interface 158. As mentioned above, media content items may be shared through various channels, including saving the selected media content item to a user's personal collection, sharing through a third party application such as SNAPCHAT, TWITTER, FACEBOOK, or other messaging application 140. In one embodiment, the sharing selection interface 158 may include a swiping menu selection feature where the user is invited to swipe through the various channels where the modified content item 156 may be shared. In one embodiment, the modified content item 156 may be stored in a media content store 120 and accessed through a Uniform Resource Locator (URL).

Figure 1E:
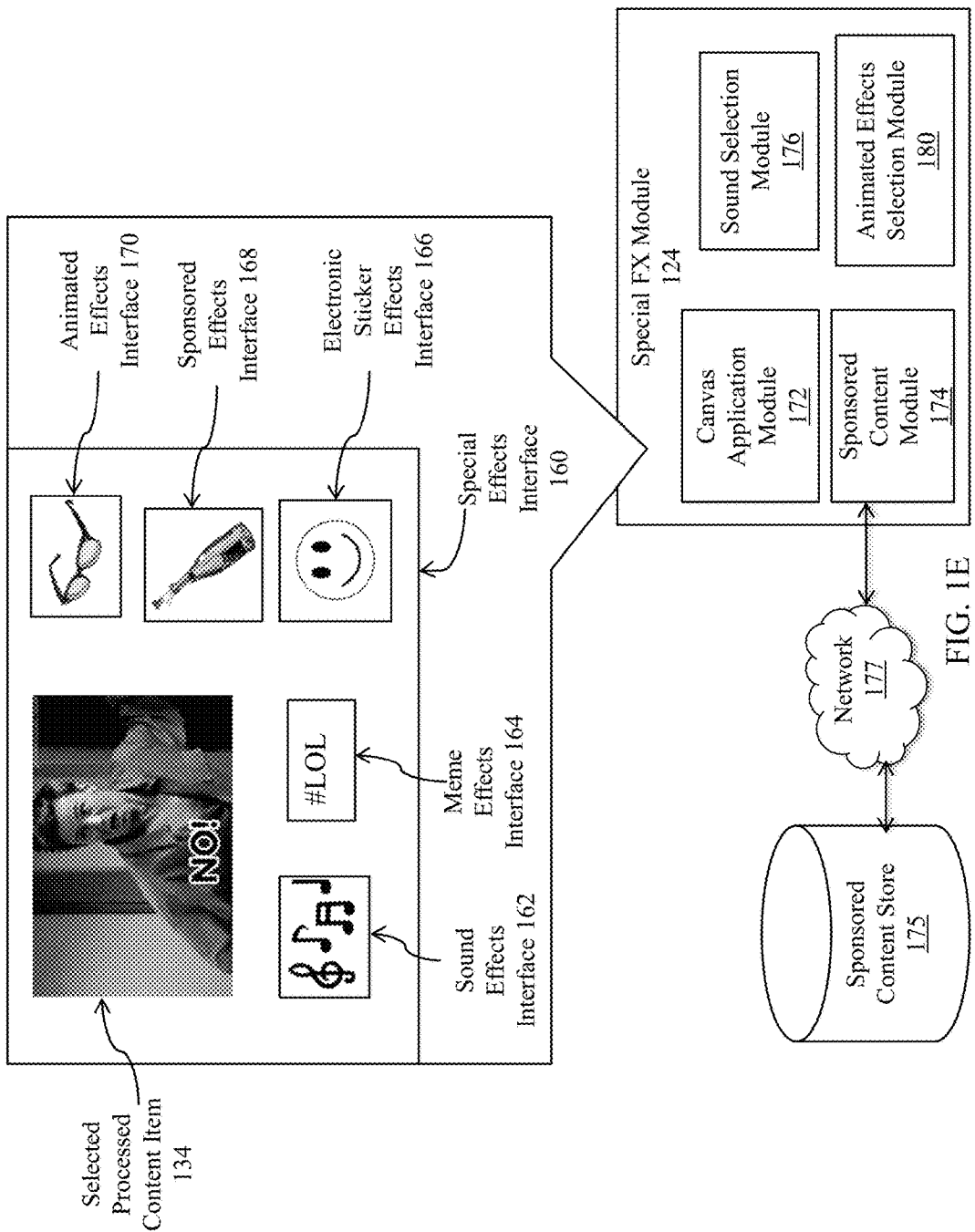
FIG. 1E is a block diagram depicting an example user interface configured to automatically add effects to a media content item, according to an embodiment.

FIG. 1E is a block diagram depicting an example user interface for a process of automatically adding effects to a media content item, according to an embodiment. In this example, a selected processed content item 134 may trigger a special effects interface 160 as provided by a special FX module 124 that includes a canvas application module 172, a sponsored content module 174, a sound selection module 176 and an animated effects selection module 180. The special effects interface 160 may include a sound effects interface 162, a "meme" effects interface 164, a sticker effects interface 166, a sponsored effects interface 168, and an animated effects interface 170. The special effects interface 160 illustrated in FIG. 1E is exemplary; more or fewer interfaces may be included in different arrangements and through different user interface techniques as known in the art.

A sound effects interface 162 may enable a user to add one or more sound effects to a selected processed content item 134. In one embodiment, pre-generated sound effects may be provided by the dynamic keyboard application 130. In another embodiment, sound effects stored on a mobile device on which the dynamic keyboard application 130 operates may be used to add to the selected processed content item 134. In a further embodiment, a sound effect may be generated and/or recorded through the mobile device or other user device. In yet another embodiment, a sound effect may be retrieved and/or downloaded from a third-party data source connected to the user device through the dynamic keyboard application 130. A volume adjuster, sound effects adjuster, and/or other known sound effects editing tools may be provided through the sound effects interface 162. The sound selection module 176 may provide other options for the sound effects interface 162, such as cutting and/or splicing portions of songs available through one or more audio applications on the user's mobile device or other user device, such as MP3s, streamed audio, voice recordings, ringtones, sound effects, and the like.

A meme effects interface 164 may enable a user to generate static text that may be positioned on the selected processed content item 134. For example, the word "NO!" may be added by a user to the selected processed content item 134. The positioning of the static text may be selected by the user, such as being located at the top-center or bottom-center of the frame, in one embodiment. In another embodiment, the positioning of the "meme"-like text may be automatically selected based on the user-entered text, such as length and/or character limitations due to font size and/or font selection, where the positioning is based on the canvas region 146 and/or bounded region of the canvas mapping object 114. In one embodiment, the meme effects interface 164 may present options to select font size, color, font, positioning, and whether to present the text in animation or statically. Meme effects interface 164 may also provide an interface for facilitating a "meme," or imagery depicting or conveying an activity, concept, or portion of media that is transmitted between persons in a manner to mock or express sarcasm regarding an object of an image. Various animation styles may also be presented as options, as known in the art.

An electronic sticker effects interface 166 may enable the user to add one or more electronic stickers, or static images, to the selected processed content item 134. In one embodiment, the electronic sticker effects interface 166 may present various images as stickers, such as emojis, third-party stickers, downloaded images, images captured by the user through a mobile device or other user device, and so forth. In another embodiment, a sticker may be animated, such as moving from one point in the frame to another point in the frame across the frames of the selected processed content item 134. In other embodiments, other animations may be used.

A sponsored effects interface 168 may enable a user to select one or more sponsored special effects for automated generation on the selected processed content item 134. For example, a champagne or other alcohol beverage distributor may wish to promote a brand by providing an animation of popping a champagne cork to celebrate New Year's Eve. A timely sponsored effect may then be propagated to the special effects interface 160 through the sponsored content module 174, the data representing the "popping champagne bottle" being access via Internet 177 from a sponsored content store 175. Upon selection of the sponsored effects interface 168, a bottle of champagne may be placed within a bounded region of the selected processed content item 134 based on the criteria of the sponsored effect. Other sponsored effects may include an unlimited amount of various special effects to promote various brands. As another example, a movie studio wishing to promote a superhero movie being released in the summer of 2016 may enable a sponsored special effect that adds glowing eyes to the eyes of the selected processed content item 134. This may be generated automatically based on eye-tracking detection data included in a canvas mapping object associated with the content item 134. As a result, sponsored content module 174 may use various data included in the canvas mapping object to automatically generate a sponsored effect through the sponsored effects interface 168.

A canvas application module 172 may use data included in the canvas mapping object associated with the selected processed content item 134 to automatically generate the special effects described above. As an example, detected face portion data may be stored in a canvas mapping object such that the location, by one or more pixels identifying the bounded region, of eyes, eyebrows, nose, cheeks, mouth, chin, forehead, or other facial features may be identified within the facial detection data of the selected processed content item 134.

An animated effects interface 170 may provide animation effects for the special effects described above. For example, a sticker may be animated to spin, bounce, slide in, slide out, spiral in, spiral out, and so forth. Various animation effects may be provided in the animated effects interface 170 by the animated effects selection module 180.

System Architecture

Figure 2:
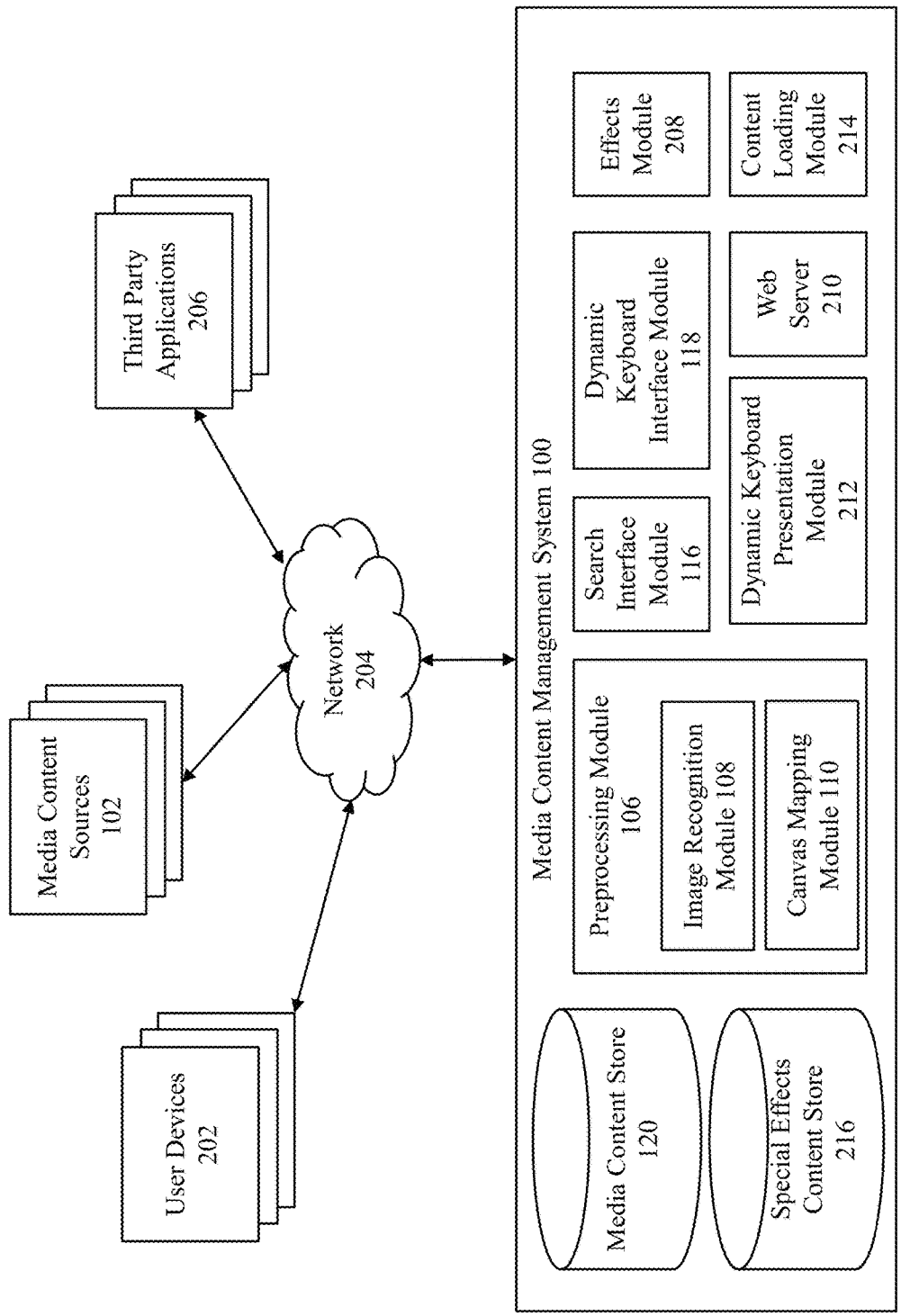
FIG. 2 is a network diagram of an automated system configured to generate and apply effects to media content in a media content management system, according to an embodiment.

FIG. 2 is a network diagram of a system for optimizing processes for compressing media content in a media content management system, showing a block diagram of the media content management system, according to an embodiment. The system environment includes one or more user devices 202, media content sources 102, third-party applications 206, the media content management system 100, and a network 204. In alternative configurations, different and/or additional modules can be included in the system.

The user devices 202 may include one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, wearable device, etc. The user device 202 is configured to communicate via network 204. The user device 202 can execute an application, for example, a browser application that allows a user of the user device 202 to interact with the media content management system 100. In another embodiment, the user device 202 interacts with the media content management system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the media content management 100. The media content management system 100 includes a media content store 120, a special effects content store 216, a search interface module 116, a preprocessing module 106 including an image recognition module 108 and a canvas mapping module 110, a dynamic keyboard interface module 118, a web server 210, a dynamic keyboard presentation module 212, an effects module 208, and a content loading module 214. In other embodiments, the media content management system 100 may include additional, fewer, or different modules for various applications. Conventional components such as network interfaces, security functions, load balancers, failover servers, management and network operations consoles, and the like are not shown so as to not obscure the details of the system.

The web server 210 links the media content management system 100 via the network 204 to one or more user devices 202; the web server 210 serves web pages, as well as other web-related content, such as Java, Flash, XML, and so forth. The web server 210 may provide the functionality of receiving and routing messages between the media content management system 100 and the user devices 20, for example, instant messages, queued messages (e.g., email), text and SMS (short message service) messages, or messages sent using any other suitable messaging technique. The user can send a request to the web server 210 to upload information, for example, images or media content are stored in the media content store 120. Additionally, the web server 210 may provide API functionality to send data directly to native user device operating systems, such as iOS, ANDROID, webOS, and RIM.

A content loading module 214 may automatically load one or more unprocessed content items 104 to the media content management system 100. In one embodiment, third-party applications 206 may be used to perform the loading functionality called by the content loading module 214. In another embodiment, a content loading module 214 may use various open-source tools, such as FFMPEG, to load content items to the media content management system 100.

A search interface module 116 may manage search requests and/or search queries for processed content items 112 in the media content management system 100 received from user devices 202, in an embodiment. A search query may be received at the search interface module 116 and processed, in one embodiment. In another embodiment, a search interface module 116 may receive a request for a collection from a user device 202 based on a user interface selection in the dynamic keyboard interface 128, such as "#HAPPY," "#RUDE," "#FOMO," and so forth as a result of a selection of an animated key or a text search. The search interface module 116 may communicate the search query to the search engine in the search interface module 116 to process the request, in an embodiment.

A dynamic keyboard interface module 118 may manage interface communications between the media content management system 100 and user devices 202. For example, the dynamic keyboard interface 128, as illustrated in FIG. 1C, may include a menu selection element that enables the searching user to view trending media content on the media content management system 100. "Trending" media content may include frequently viewed and/or frequently shared content by users of the media content management system 100. The dynamic keyboard interface module 118 may receive the request for trending media content and retrieve processed content items 112 from the media content store 120 that have the highest number of shares in the past hour, for example. The dynamic keyboard interface module 118 may then, through the dynamic keyboard presentation module 212, provide the retrieved trending media content items to the dynamic keyboard interface 128 through the dynamic keyboard application 130, in one embodiment. The dynamic keyboard presentation module 212 may determine how the media content items are presented and in what order, for example. In one embodiment, if no media content items satisfy a search query or request from a user device, the dynamic keyboard interface module 118 may, in conjunction or in coordination with the search interface module 116, deliver other processed content items 112 that are popular or have been shared. In one embodiment, content items may be selected by the dynamic keyboard interface module 118 from third party applications 206 (or websites), such as TUMBLR, to be included in the search results or animated keys of the dynamic keyboard interface 128.

A heuristics engine may be included in a canvas mapping module 110 and may include one or more heuristics rules to determine one or more outcomes. For example, the canvas mapping module 110 may use the heuristics engine to determine a ranking of candidate canvas regions based on the size of the bounded regions and criteria of special effects. Various heuristic rules may be associated with one or both of the threshold area size of a bounded region and the location of the bounded region, such as prioritizing larger bounded regions for sponsored effects and/or selected media content sources 102, prioritizing larger bounded regions for selection of the canvas mapping region, and so forth. Various heuristic rules may be generated by administrators to automatically select a canvas region, in one embodiment. In another embodiment, heuristic rules may also use ranges of values for various special effects. For example, a bottle popping may require less space than a user-generated caption presented in animation. An effects module 208 may provide special effects as generated by administrators, such as a pair of sunglasses in animation dropping from the top-center of the frame of the processed content item 112 to cover the eyes of the face as detected by the image recognition module 108 and/or canvas mapping module 110 using eye-tracking algorithms and methods.

Preprocessing Content Items

Figure 3:
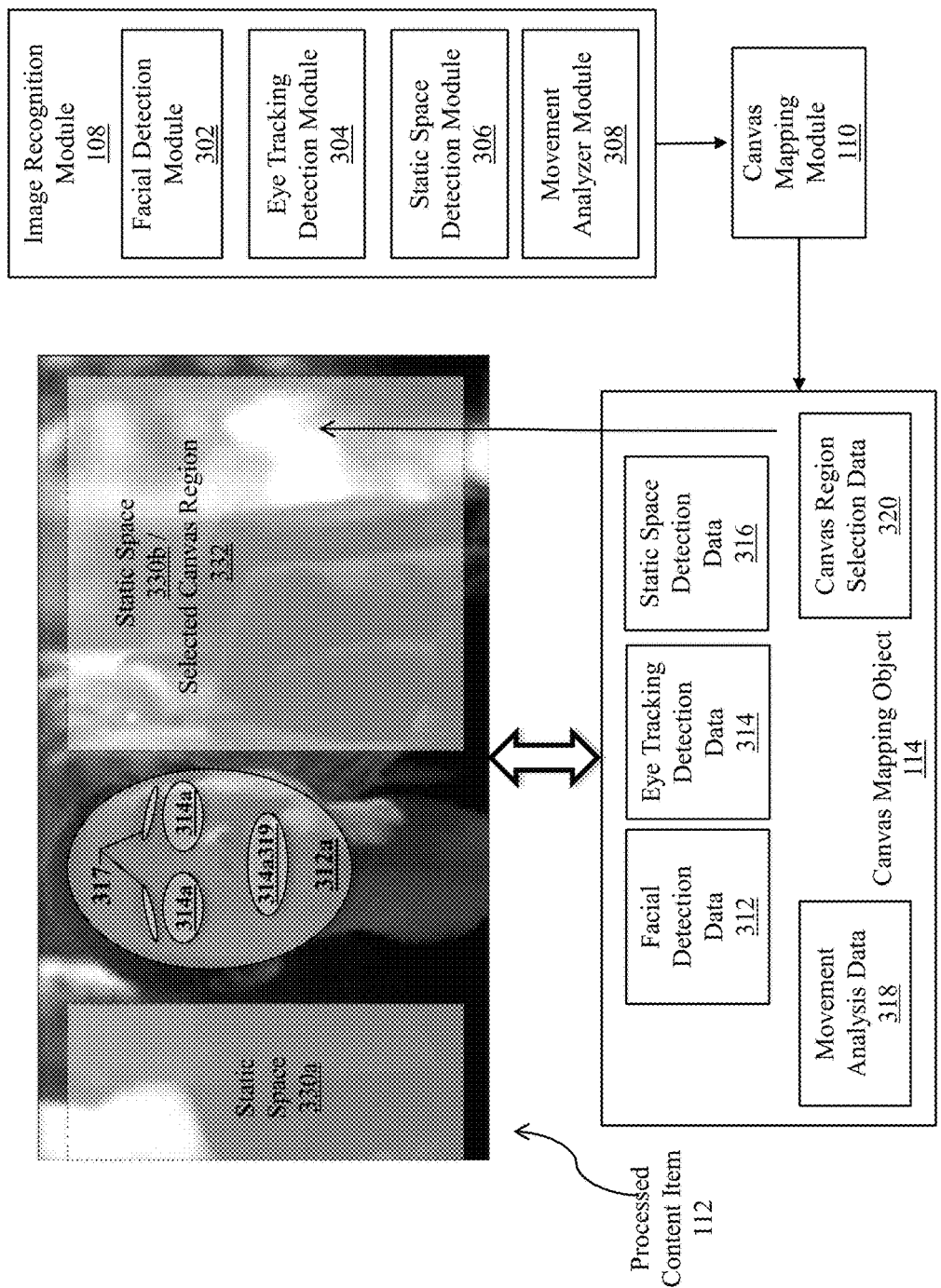
FIG. 3 is a block diagram depicting a system configured to implement image detection in preprocessing of media content in a media content management system, according to an embodiment.

FIG. 3 is a block diagram of a system for image detection preprocessing of media content in a media content management system, according to an embodiment. An image recognition module 108 may include a facial detection module 302, an eye tracking detection module 304, a static space detection module 306, and a movement analyzer module 308. A facial detection module 302 may generate facial detection data 312 to be stored in a canvas mapping object 114. Facial detection data 312 may include multiple location coordinates, by pixel, indicating the outline of a face, as well as facial features, such as eyes, nose, mouth, forehead, cheeks, chin, eyebrows, and so forth. Facial detection module 302 may implement one or more third party applications 206, in an embodiment. By identifying features of the face, including the face itself, the facial detection module 302 may identify one or more emphasized portions of the content item as opposed to de-emphasized portions, or merely background imagery. As a result, static spaces, or the de-emphasized portions not including detected facial features, may be identified using the facial detection data 312. Additionally, special effects, such as adding animated pixelated sunglasses, or shades, may be superimposed on the image frame to cover the detected eyes within the content item. Thus, facial detection data 312, which may be derived from pixel data representing features of a face 312*a*, may be used to locate the eyes in pixel data of the frames including the content item. The pixelated sunglasses, or "shades," may incorporate an additional meaning beyond eyewear that provides sun-protection. Rather, "shades" may invoke a coolness statement, an awesomeness emotion, a "throwing shade" colloquialism intending to insult or otherwise belittle the recipient, and/or any number of additional meanings, ideas, thoughts, semi-structured sentences, and symbolisms intended by users and/or administrators of the media content management system 100. As such, the facial detection data 312 may be used to enable conveyance of these non-textual and non-verbal communications through the medium of content items in the media content management system 100.

Eye tracking detection module 304 may generate eye tracking detection data 314 derived from pixel data representing eyes 314*a* to be stored in a canvas mapping object 114. While facial detection data 312 may include a general location of the eyes within the region designated as a face, eye tracking detection data 314 may identify one or more locations, through pixel coordinates, of an outline of the eyes and tracking the eyes in each frame of the content item over the timeline of the content item. Additionally, the eye tracking detection data may identify portions of the eyes, such as pupils or areas around pupils, such as white areas, as well as movement tracking of the eyes to predict, for example, a direction of a subject's gaze (e.g., a directionality in three-dimensional space towards an object within or outside of the image). Moreover, eye tracking data 314 may further include more subtle movements, such as an eye roll, a glare, a stare, and the like, that may be associated with various emotional states and/or expressive statements, described as content associations above and further described in the application referenced above and incorporated by reference. As a result, eye tracking data 314 may be used to predict various searching-user intents, such as an intent to find a content item that expresses disgust or a desire to "throw shade" or otherwise insult the receiving-user of the content item. An emoji depicting an umbrella on a beach that provides shade may be associated with the colloquial use of the term "throwing shade," "shady," "shade," and the like in the media content management system 100 as content associations. Similarly, an emoji depicting a face with wide eyes and hands on the face may be associated with the content associations of "OMG", "WOW", and/or eyes glaring in amazement. In this way, non-verbal cues, such as eye rolls, glares, stares, blinks, and dismissive glances, may be captured in the eye tracking data 314, in one embodiment, and used to communicate one or more ideas that cannot be expressed in words or symbols alone. Non-textual symbolism of the content item is thus enhanced by the eye tracking data 314.

Static space detection module 306 may generate static space detection data 316 to be stored in a canvas mapping object 114. The static space detection data 316 may include a bounded region, identified by multiple pixel coordinates, that may be rectangular, in one embodiment. The static space may be detected based on identifying space within the frame that is adjacent to detected faces, in an embodiment. In another embodiment, a static space 330 (e.g., static spaces 330*a* and 330*b*) may be identified based on color value difference of the pixels across the frames. For example, a static image across multiple frames in a content item may have pixels that have very little color difference values, indicating that the space is static. A bounded region identifying the bounds of the static space may be identified by pixel locations in the frame and stored as the static space detection data 316. In an embodiment, static space detection data 316 may reference more than one static spaces 330a and 330b in the processed content item 112. As shown in FIG. 3, static space 330a may be relatively narrower and smaller than static space 330b in terms of bounded regions. In some examples, a static space 330 may refer to a bounded area of an image frame that includes "background" imagery (e.g., de-emphasized portions of the frame) relative to "foreground" imagery (e.g., portions of a frame for which the content item communicates an idea, thought, or concept). Static spaces 330 may be identified to include a canvas region into which text or non-text symbols may be inserted or added. As illustrated in FIG. 3, selected canvas region 332 identifies static space 330b as having space to add text or non-text symbols into the content item, even though static space 330b may include background imagery that has moving figures. The background imagery need not be emphasized, and as a result, may be designated as a "static space" for which a canvas region may be included.

A movement analyzer module 308 may generate movement analysis data 318 to be stored in a canvas mapping object 114. Movement analysis data 318 may identify pixel data in portions of the frame that have movement as indicated, for example, by high levels of color difference values from frame to frame, in one embodiment. In other embodiments, the movement analyzer module 308 may implement a third party application 206. In a further embodiment, movement analysis data 318 may include one or more portions of a face 312a that has been identified as moving, such as facial portion 319 (e.g., a mouth). For example, in the processed content item 112 illustrated in FIG. 3, and also illustrated in the example screenshots of FIG. 1D, the eyebrows 317 of the face may be detected to be moving based on the facial detection data 312 or otherwise have certain orientations (e.g., an eyebrow orientation can be used to predict an expressive state (e.g., raised eyebrows may correlate with an expressive state of "surprise").

A canvas mapping module 110 may store at least one of the facial detection data 312, the eye tracking detection data 314, the static space detection data 316 and the movement analysis data 318 in the canvas mapping object 114. The canvas mapping object 114 may be implemented as a metadata attribute of the processed content item 112, in one embodiment. Metadata attributes may be data items attached or otherwise associated with a data object. In some examples, a data item may be a text file including extensible markup language (XML) for each metadata attribute. In another example, a data item may include a data value associated with the data object, such as in a header file of an HTML webpage, and so forth. In yet a further example, data items may include data values stored in a data store (e.g., a database or file including the data values) associated with the data object, such that the data items are referenced by a uniform resource locator (URL) and/or linked to the data object to enable the data items to be accessed by the data object. A metadata attribute may represent a characteristic of a content item or image. For example, an image may be "tagged" as being related to expressive state of "happy," which may be used to group the image or select the image for modification. In a further embodiment, the canvas mapping module 110 may select a canvas region from among the identified static spaces in the content item. Canvas region selection data 320 may be stored in the canvas mapping object 114 based on the selection of the canvas region by the canvas mapping module 110, as described herein.

Figure 4:
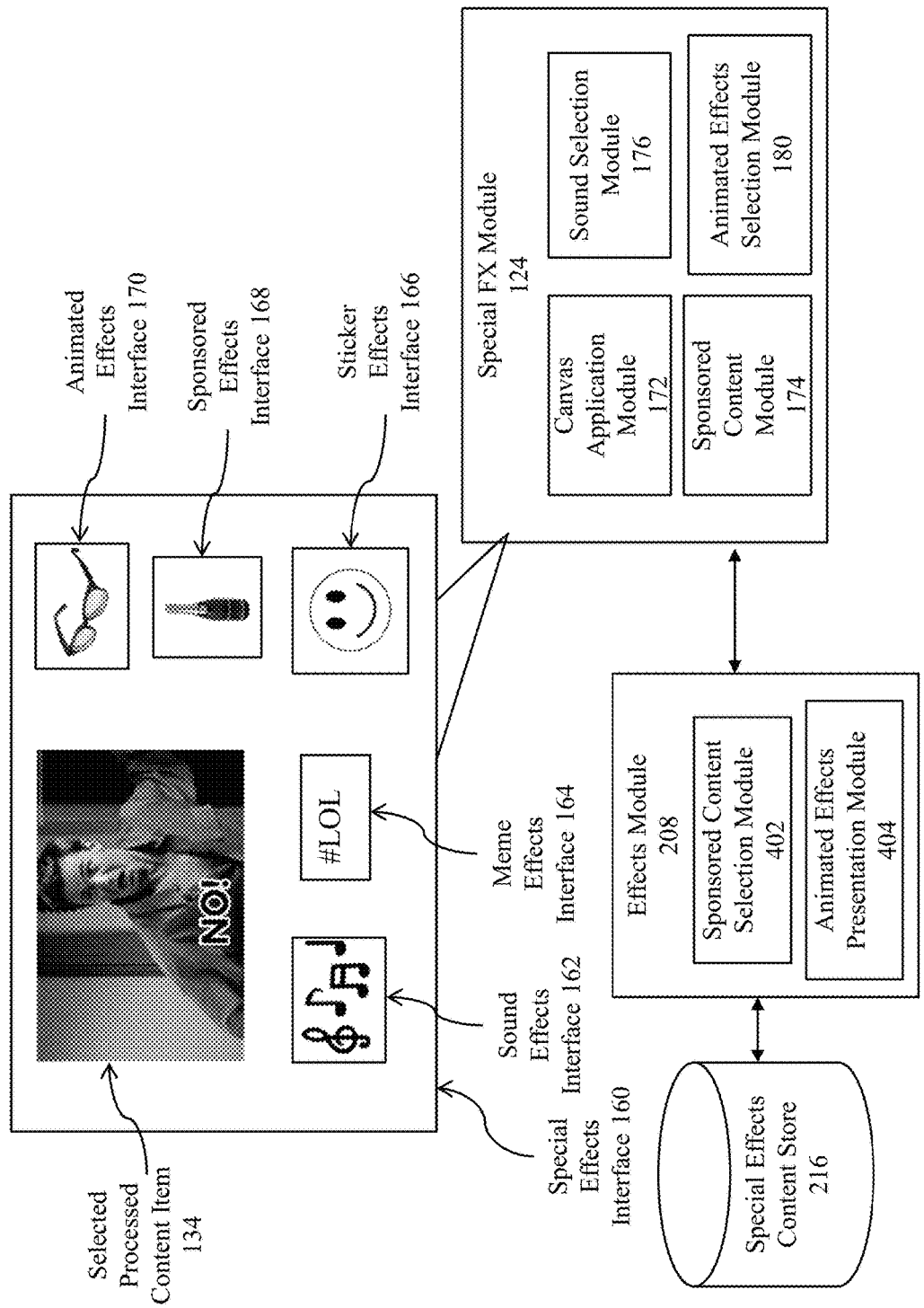
FIG. 4 is a block diagram of an example of a system configured to provide effects to modify media content items to form user-generated content in a media content management system, according to some examples.

FIG. 4 is a block diagram of a system for providing effects for user-generated content on media content items in a media content management system, according to some examples. As previously illustrated in FIG. 1E, a special effects interface 160 may be presented on a user device to enable a user to add one or more special effects to a selected processed content item 134. The special FX module 124 included in a dynamic keyboard application 130 may be supported and/or connected to an effects module 208 on the media content management system 100. The effects module 208 may include a sponsored content selection module 402 and an animated effects presentation module 404. A special effects content store 216 may act as a repository for special effects to be automatically added to a selected processed content item 134 upon selection by a user through the special effects interface 160. In other embodiment, special effects, animated or static, such as fireworks, rainbows, Christmas decorations, and the like, may be automatically added based on a time of year for more popular content items on the media content management system 100. Other triggers may be programmatically added by administrators of the media content management system 100 to generate special effects on content items, using various metrics such as popularity of content, predicted content based on a user behavior in the media content management system 100, predicted user states based on previously shared content and/or selected recipients, and other heuristic rules to determine user intent as described in the referenced applications incorporated by reference above.

A sponsored content selection module 402 may enable advertisers to upload a sponsored effect to be included in a sponsored effects interface 168 through the sponsored content module 174 of the special FX module 124. In an embodiment, a sponsored content selection module 402 may select a sponsored effect may be based on context, such as a highest bid for a predefined time period, such as hourly, daily, weekly, monthly, and/or a time period related to a special event, holiday, season, or other marketable time period. For example, a summer vacation related sponsored effect highlighting a cold beer sticker advertising a branded beer may be selected by the sponsored content selection module 402 based on a combination of the time period of the user device (summer season based on location), a brand awareness criteria (demographics of the user device), and winning bid among competing sponsored content. Other criteria may be used in selected sponsored content on the media content management system 100, as selected by administrators.

An animated effects presentation module 404 may provide a curated selection of animation styles for use in the animated effects interface 170 as provided by the animated effects selection module 180 in the special FX module 124. For example, a new animation style may be presented weekly to users to increase engagement with the dynamic keyboard application and the special effects interface 160. In a further embodiment, as new animation styles become available, the new animated effects may be pushed to a user's device through the animated effects presentation module 404. In an embodiment, a third party application 206 may be used to implement new animations as presented in the media content management system 100. The available special effects may be stored in the special effects content store 216, such as animations, stickers, sounds, song snippets, ringtones, font styles, and sponsored effects.

Figure 5:
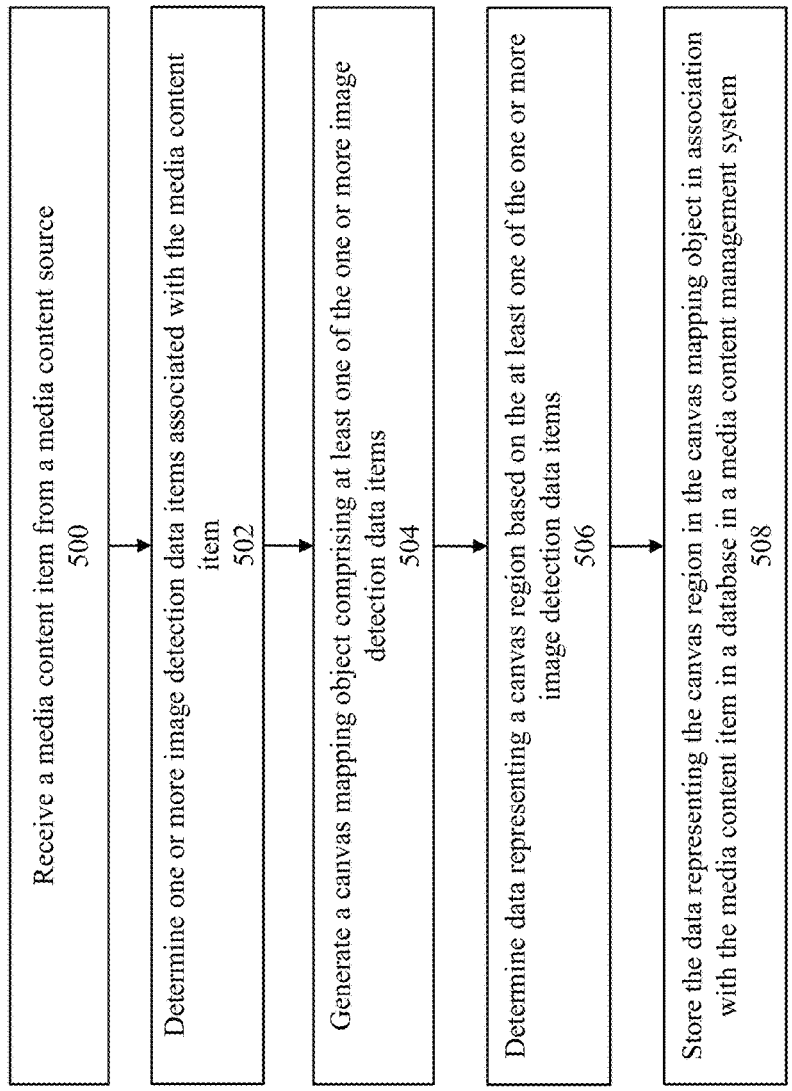
FIG. 5 is an example flowchart depicting preprocessing of media content items in a media content management system, according to some examples.

FIG. 5 is an example flowchart of a process for preprocessing media content items in a media content management system, according to some examples. A media content item may be received 500 from a media content source. One or more image detection data items associated with the media content item may be determined 502. A canvas mapping object comprising at least one of the one or more image detection data items may be generated 504. Data representing a canvas region based on the at least one of the one or more image detection data items is determined 506. Then, the data representing the canvas region is stored 508 in the canvas mapping object in association with the media content item in a database in a media content management system.

Figure 6:
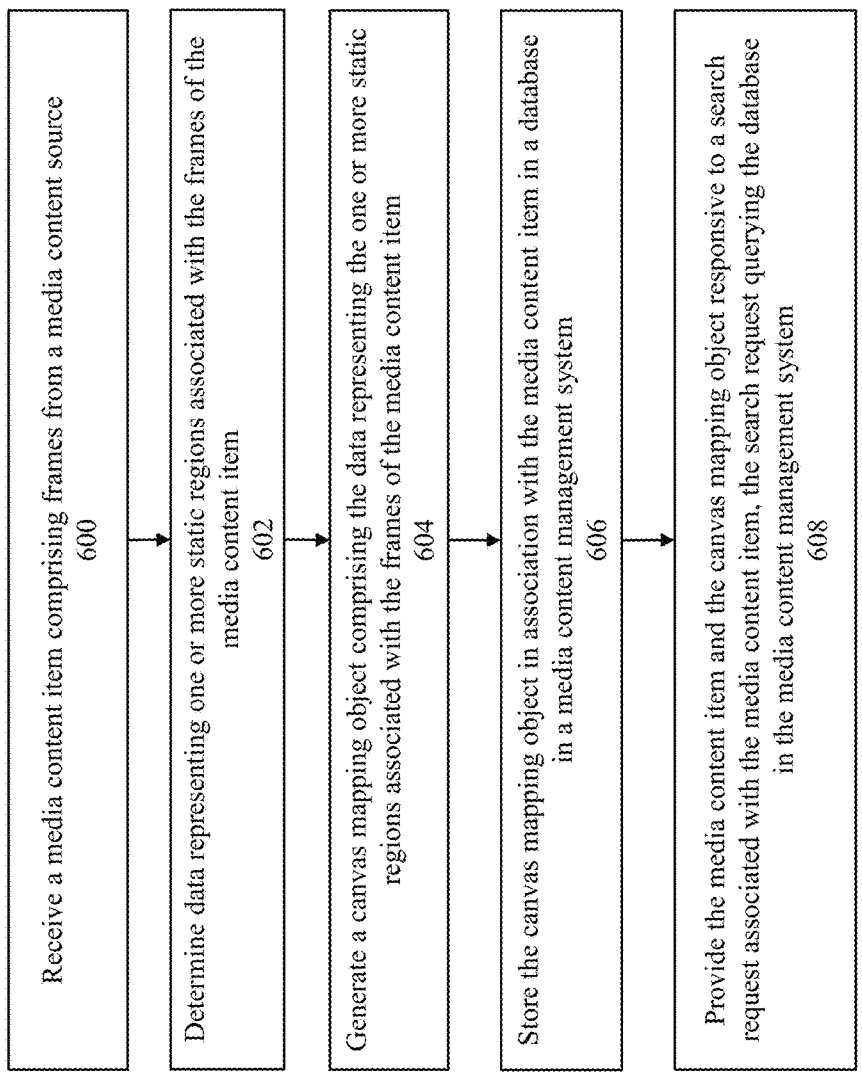
FIG. 6 is an example flowchart depicting preprocessed of media content in a media content management system, according to some examples.

FIG. 6 is an example flowchart of a process for providing preprocessed media content in a media content management system, according to some examples. A media content item comprising multiple frames is received 600 from a media content source. Data representing one or more static regions associated with the frames of the media content item may be determined 602. A canvas mapping object comprising the data representing the one or more static regions associated with the frames of the media content item is generated 604. The canvas mapping object is then stored 606 in association with the media content item in a database in a media content management system. Responsive to a search request associated with the media content item, the media content item and the canvas mapping object are provided 608, where the search request queries the database in the media content management system.

Figure 7:
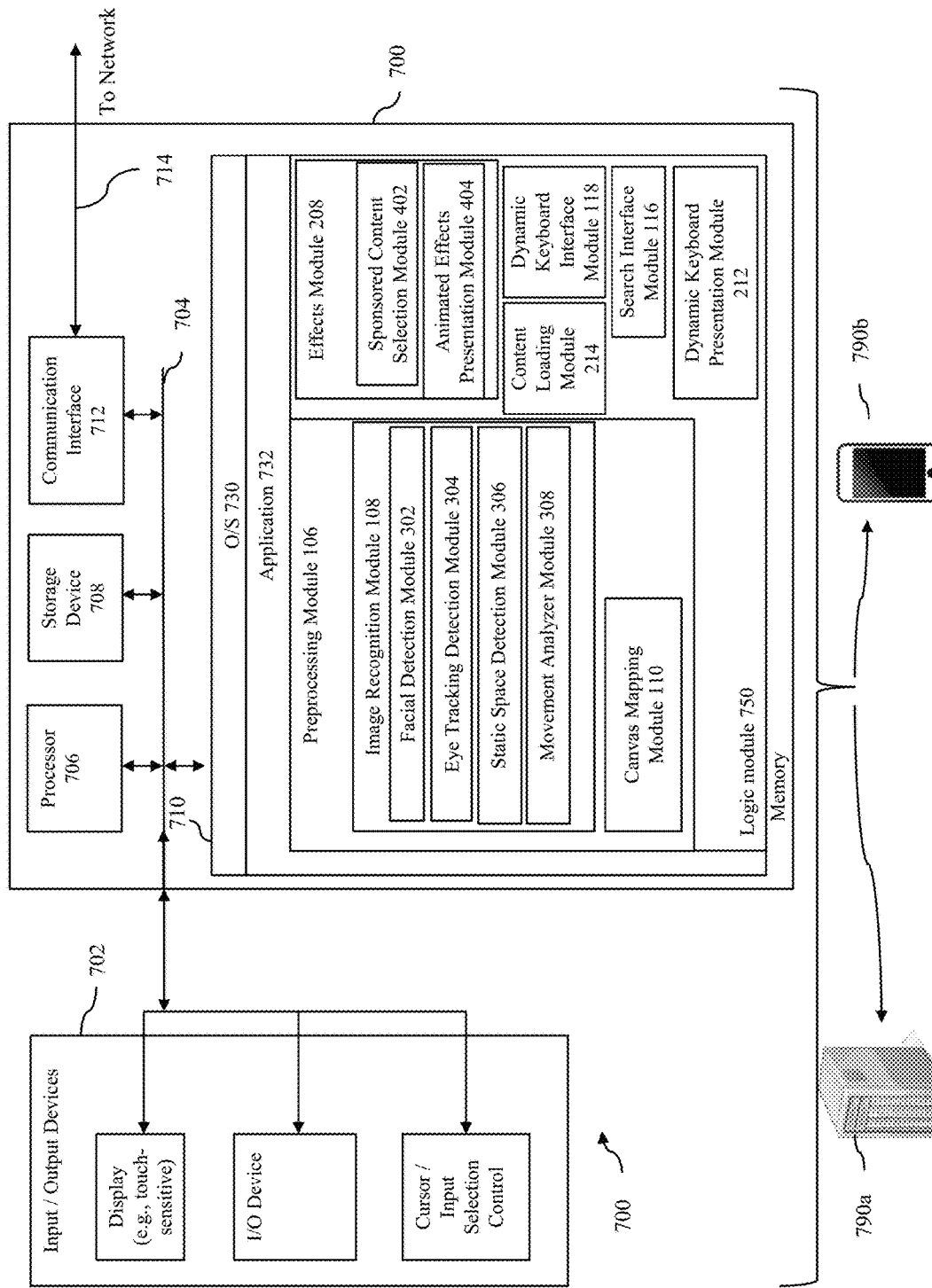
FIG. 7 illustrates an exemplary computing platform disposed in a device configured to optimize preprocessing of media content for generating effects in accordance with various embodiments.

FIG. 7 illustrates an exemplary computing platform disposed in a device configured to optimize processes for preprocessing media content for effects generation in accordance with various embodiments. In some examples, computing platform 700 may be used to implement computer programs, applications, methods, processes, algorithms, or other software to perform the above-described techniques.

In some cases, computing platform can be disposed in wearable device or implement, a mobile computing device 790b, or any other device, such as a computing device 790a.

Computing platform 700 includes a bus 704 or other communication mechanism for communicating information, which interconnects subsystems and devices, such as processor 706, system memory 710 (e.g., RAM, etc.), storage device 708 (e.g., ROM, etc.), a communication interface 712 (e.g., an Ethernet or wireless controller, a Bluetooth controller, etc.) to facilitate communications via a port on communication link 714 to communicate, for example, with a computing device, including mobile computing and/or communication devices with processors. Processor 706 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 702, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 706 executing one or more sequences of one or more instructions stored in system memory 710, and computing platform 700 can be implemented in a client-server arrangement, peer-to-peer arrangement, or as any mobile computing device, including smart phones and the like. Such instructions or data may be read into system memory 710 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 706 for execution. Such a medium may take many forms, including but not limited to, non-volatile media and volatile media. Non-volatile media includes, for example, optical or magnetic disks and the like. Volatile media includes dynamic memory, such as system memory 710.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 704 for transmitting a computer data signal.

In some examples, execution of the sequences of instructions may be performed by computing platform 700. According to some examples, computing platform 700 can be coupled by communication link 714 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 700 may transmit and receive messages, data, and instructions, including program code (e.g., application code) through communication link 714 and communication interface 712. Received program code may be executed by processor 706 as it is received, and/or stored in memory 710 or other non-volatile storage for later execution.

In the example shown, system memory 710 can include various modules that include executable instructions to implement functionalities described herein. System memory 710 may include an operating system ("O/S") 730, as well as an application 732 and/or logic module 750. In the example shown, system memory 710 includes a preprocessing module 106 including an image recognition module 108 that includes a facial detection module 302, an eye tracking detection module 304, a static space detection module 306, and a movement analyzer module 308, a canvas mapping module 110, an effect module 208 including a sponsored content selection module 402 and an animated effects presentation module 404. The system memory 710 may also include a search interface module 116, a dynamic keyboard interface module 118, a dynamic keyboard presentation module 212, and a content loading module 214. One or more of the modules included in memory 710 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a media content management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a dynamic keyboard presentation module 212 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a media content management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A method comprising:
   receiving a media content item in an media content management system, wherein the media content item comprises a video file in a graphics interchange format (GIF);
   determining one or more image detection data items associated with the media content item, wherein determining one or more image detection data items associated with the media content item further comprises:
     determining data representing a detected facial feature in the video file using a facial recognition module; and
     determining the data representing the detected facial feature as an image detection data item of the one or more image detection data items;
   generating, by a processor, a canvas mapping object comprising at least one of the one or more image detection data items;
   determining data representing a canvas region based on the at least one of the one or more image detection data items; and
   storing the data representing the canvas region in the canvas mapping object in association with the media content item in a database in the media content management system.

2. The method of claim 1, wherein determining one or more image detection data items associated with the media content item further comprises:
   determining data representing a detected eye tracking feature in the video file using an eye tracking module; and
   determining the data representing the detected eye tracking feature as an image detection data item of the one or more image detection data items.

3. The method of claim 1, and wherein determining one or more image detection data items associated with the media content item further comprises:
   determining data representing a detected static space in the video file using a static space detection module; and
   determining the data representing the detected static space as an image detection data item of the one or more image detection data items.

4. The method of claim 3, wherein the data representing static space detection in the video file comprises a bounded region of the video file, the bounded region comprising the data representing the canvas region.

5. The method of claim 3, wherein the data representing static space detection in the video file comprises a plurality of bounded regions in the video file, and wherein determining data representing a canvas region further comprises:
   selecting a bounded region of the plurality of bounded regions based on a predetermined pixel region threshold associated with one or more effects generation criteria.

6. The method of claim 1, wherein generating a canvas mapping object comprising at least one of the one or more image detection data items further comprises:
   determining data representing a detected facial feature in the media content item;
   determining one or more bounded regions adjacent to the detected facial feature based on the one or more image detection data items; and
   storing the one or more bounded regions in the canvas mapping object.

7. The method of claim 1, wherein determining data representing a canvas region based on the at least one of the one or more image detection data items further comprises:
   determining one or more effects generation criteria associated with automated effects generation; and
   selecting an image detection data item from the one or more image detection data items based on the one or more effects generation criteria as the canvas region.

8. The method of claim 1, further comprising:
   receiving a request associated with the media content item from a user device; and
   providing the media content item and the canvas mapping object to the user device responsive to the request.

9. The method of claim 8, wherein the request comprises a search request from a dynamic keyboard interface on the user device.

10. The method of claim 9, wherein providing the media content item and the canvas mapping object further comprises:
    providing a plurality of pixel location coordinates defining the canvas region within the media content item; and
    enabling an effects generation module on the dynamic keyboard interface to modify the media content item at the plurality of pixel location coordinates.

11. A method comprising:
    receiving, in an media content management system, a media content item comprising a plurality of frames;
    determining data representing one or more static regions associated with the plurality of frames of the media content item, wherein the data representing the one or more static regions associated with the plurality of frames is determined based on a color difference value determined as a percentage change in color value among a plurality of pixels in the plurality of frames;

generating, by a processor, a canvas mapping object comprising the data representing the one or more static regions associated with the plurality of frames of the media content item;

storing the canvas mapping object in association with the media content item in a database in the media content management system; and providing the media content item and the canvas mapping object responsive to a search request associated with the media content item, the search request querying the database in the media content management system.

12. The method of claim 11, wherein the canvas mapping object is stored as a metadata attribute of the media content item.

13. The method of claim 11, wherein the data representing the one or more static regions associated with the plurality of frames is determined based on a movement analysis of an object across the plurality of frames.

14. A system comprising:
a server configured to receive a media content item comprising a plurality of frames, receive a search query, retrieve at least two media content items in the database, generate at least two renderings of the at least two media content items in animation in response to the received search query, provide to display concurrently the at least two renderings of the at least two media content items in animation, and to provide associated canvas mapping objects in relation with the at least two media content items;

a preprocessing module configured to determine data representing one or more static regions associated with the plurality of frames of the media content item, generate a canvas mapping object comprising the data representing the one or more static regions associated with the plurality of frames, and preprocessing module further configured to determine one or more image detection data items based on the plurality of frames of the media content item;

a processor configured to determine data representing a canvas region from the data representing the one or more static regions based on the one or more image detection data items, to configure the canvas mapping object to identify a plurality of location coordinates associated with the data representing the canvas region, the plurality of location coordinates defined in relation to the plurality of frames of the media content item, and the processor further configured to define the plurality of location coordinates based on at least one of the one or more image detection data items; and a database configured to store, by the processor, the media content item in association with the canvas mapping object comprising the data representing the canvas region in association with the plurality of frames.

15. The system of claim 14, wherein the one or more image detection data items associated with the media content item further comprises at least one of a facial detection data item, an eye tracking detection data item, a movement analysis data item, and a static space detection data item.

16. The system of claim 14, wherein the processor is further configured to generate the canvas mapping object using a third party application communicatively coupled to the server.

17. The system of claim 14, wherein preprocessing module is further configured to determine the data representing the one or more static regions based on a color difference value defined as a percentage change in color value among a plurality of color values associated with a plurality of pixels in each frame of the plurality of frames of the media content item.

18. A method comprising:
receiving a media content item in an media content management system, wherein the media content item comprises a video file in a graphics interchange format (GIF);

determining one or more image detection data items associated with the media content item, and wherein determining one or more image detection data items associated with the media content item further comprises:
determining data representing a detected static space in the video file using a static space detection module; and
determining the data representing the detected static space as an image detection data item of the one or more image detection data items;

generating, by a processor, a canvas mapping object comprising at least one of the one or more image detection data items;

determining data representing a canvas region based on the at least one of the one or more image detection data items; and storing the data representing the canvas region in the canvas mapping object in association with the media content item in a database in the media content management system.

19. A system comprising:
a server configured to receive a media content item comprising a plurality of frames;

a preprocessing module configured to determine data representing one or more static regions associated with the plurality of frames of the media content item, generate a canvas mapping object comprising the data representing the one or more static regions associated with the plurality of frames, and preprocessing module further configured to determine one or more image detection data items based on the plurality of frames of the media content item;

a processor configured to determine data representing a canvas region from the data representing the one or more static regions based on the one or more image detection data items, to configure the canvas mapping object to identify a plurality of location coordinates associated with the data representing the canvas region, the plurality of location coordinates defined in relation to the plurality of frames of the media content item, and the processor further configured to define the plurality of location coordinates based on at least one of the one or more image detection data items, wherein the one or more image detection data items associated with the media content item further comprises at least one of a facial detection data item, an eye tracking detection data item, a movement analysis data item, and a static space detection data item; and a database configured to store, by the processor, the media content item in association with the canvas mapping object comprising the data representing the canvas region in association with the plurality of frames.

20. A system comprising:
a server configured to receive a media content item comprising a plurality of frames;

a preprocessing module configured to determine data representing one or more static regions associated with the plurality of frames of the media content item, generate a canvas mapping object comprising the data representing the one or more static regions associated with the plurality of frames, and preprocessing module further configured to determine one or more image detection data items based on the plurality of frames of the media content item;

a processor configured to determine data representing a canvas region from the data representing the one or more static regions based on the one or more image detection data items, generate a canvas mapping object using a third party application communicatively coupled to the server, and configure the canvas mapping object to identify a plurality of location coordinates associated with the data representing the canvas region, the plurality of location coordinates defined in relation to the plurality of frames of the media content item, and the processor further configured to define the plurality of location coordinates based on at least one of the one or more image detection data items; and a database configured to store, by the processor, the media content item in association with the canvas mapping object comprising the data representing the canvas region in association with the plurality of frames.

* * * * *